C. S. SHARP.
HARROW.
APPLICATION FILED AUG. 1, 1912.
1,214,961. Patented Feb. 6, 1917.
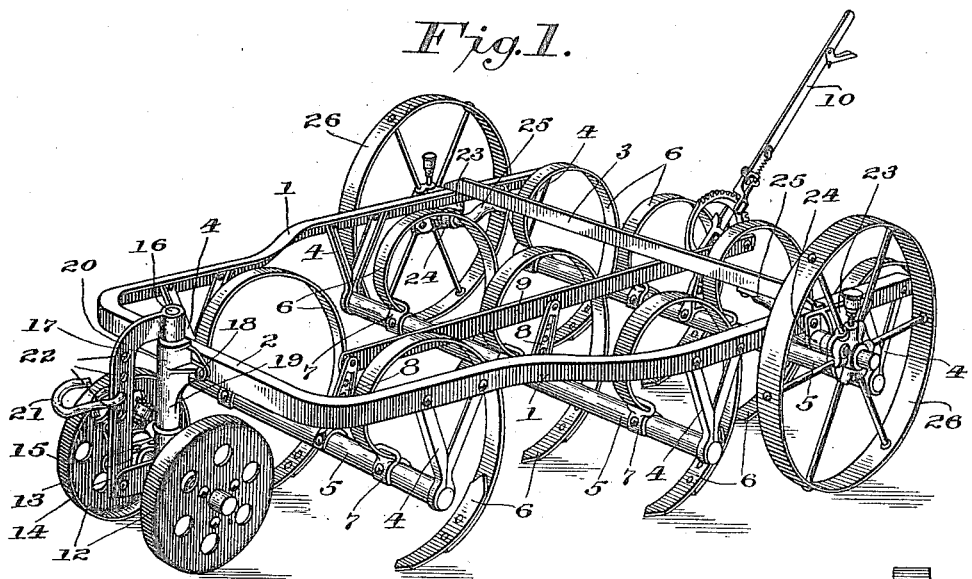
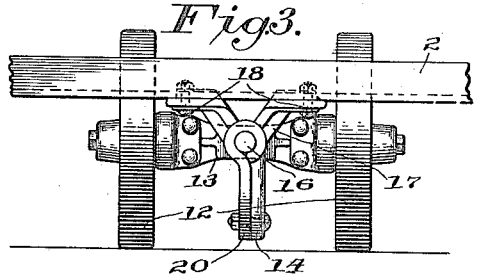
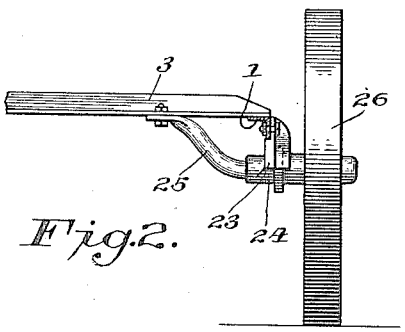
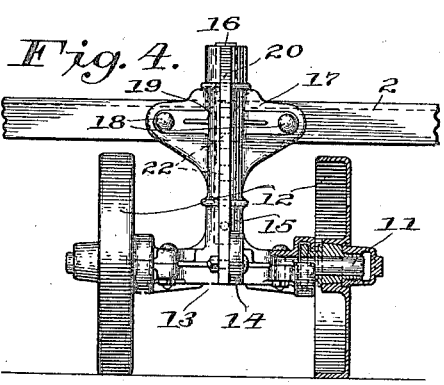
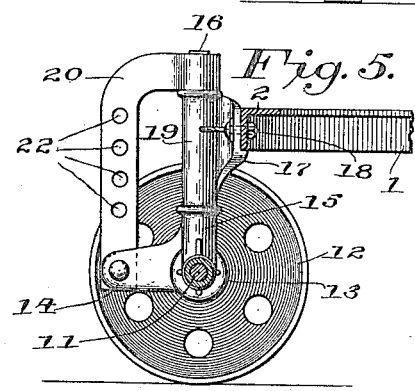
Witnesses:
C. C. Palmer
F. W. Hoffmeister
Inventor:
Charles S. Sharp,
By E. W. Burgess
Attorney

UNITED STATES PATENT OFFICE.

CHARLES S. SHARP, OF AUBURN, NEW YORK, ASSIGNOR TO INTERNATIONAL HARVESTER COMPANY OF NEW JERSEY, A CORPORATION OF NEW JERSEY.

HARROW.

1,214,961. Specification of Letters Patent. Patented Feb. 6, 1917.

Application filed August 1, 1912. Serial No. 712,629.

*To all whom it may concern:*

Be it known that I, CHARLES S. SHARP, a citizen of the United States, residing at Auburn, in the county of Cayuga and State of New York, have invented certain new and useful Improvements in Harrows, of which the following is a specification.

My invention relates to harrows, and in particular to the construction of the frame and the manner of mounting it upon the forecarriage and carrying wheels; the object of my invention being to provide a construction that may be readily manipulated in a manner to regulate the depth of tillage or placed in position for transportation, simple and strong and efficient in operation. These objects are attained by means of mechanism, one embodiment of which is illustrated in the accompanying drawings, in which—

Figure 1 is a perspective view of a harrow having my invention forming a part thereof;

Fig. 2 is a detached detail of the mechanism, showing the manner of mounting the frame structure upon the carrying wheels;

Fig. 3 is a top plan view of the forecarriage and showing the manner of connecting it with the front of the harrow frame;

Fig. 4 is a front elevation of Fig. 3 with one wheel and part of its bearings shown in section; and, Fig. 5 is a side elevation of Fig. 4 with one of the wheels removed.

The same reference numerals designate like parts throughout the several views.

The frame is substantially U-shape in form, having side members 1, a head 2 and a transversely arranged bar 3 secured to the rear ends of the side members 1. 4 represents depending bracket members triangular in form and secured to the side members 1 in spaced relation. 5 represents turnable tooth carrying bars having opposite ends thereof journaled in the lower ends of bracket members 4 and having curved spring teeth 6 secured thereto by means of clips 7. Secured to each of the bars 5, intermediate the ends thereof, are lever arms 8 having the upper ends thereof connected by means of a bar 9, and 10 represents a hand lever connected with the bar whereby the tooth carrying bar may be rocked in either direction for the purpose of adjusting the points of the teeth to any desired plane relative to the harrow frame as is common in the construction of this class of harrows.

The forecarriage includes an axle 11 having wheels 12 journaled thereon, a bracket member 13 secured to the axle and provided with a forwardly projecting arm 14, and a vertically arranged socket member 15, in which is secured a stem 16. 17 represents a bracket secured to the head member 2 of the harrow frame by means of bolts 18 and provided with a vertically arranged sleeve 19 that receives the stem 16; 20 a draft member having the upper end thereof secured to the upper end of stem 16 and its lower end to the front end of arm 14, and 21 represents a double hook member that may be received by any one of a series of transverse openings 22 in the draft member 20 for the purpose of adjusting the line of draft. 23 represents bracket members secured to the side frame members 1, upon opposite sides of the harrow, at the rear end thereof, and provided with laterally extending sleeve portions 24 that receive the body portions of stub axle members 25, having the inner ends thereof turned upward and inward and secured to the transverse bar 3, and 26 represents carrying wheels journaled upon the opposite ends thereof.

The carrying wheels for the forecarriage operate as depth regulators for the teeth when they are in an operative position and as transporting wheels when the teeth are raised from the ground.

While I have in this application specifically described one embodiment of my invention, it is, of course, to be understood that the same may be embodied in other forms, and the specific construction shown may be modified without departing from the spirit of the invention.

What I claim as my invention, and desire to secure by Letters Patent, is:

1. In a tillage implement, a frame having spaced side members, tillage implement carrying members connected between the side members thereof, a supplemental transverse brace connecting said side members, stub axles attached to the ends of said brace and protruding laterally from said frame, and transport wheels rotatably mounted on said axles.

2. In a tillage implement, a frame having spaced side members, a transverse brace rigidly connecting said side members, axle members attached to said brace and protruding laterally from the frame, brackets carried on the side members of said frame through which said axles extend, and wheels rotatably mounted on the protruding ends of said axles.

3. In a tillage implement, a frame comprising a substantially U-shaped member and a transverse brace rigidly connecting the rearwardly extending arms thereof, supplemental axle members attached to said frame protruding laterally therefrom at points adjacent the rear ends of the frame arms, transport wheels rotatably mounted on said axles at points on opposite sides of said frame, and a coöperating frame-supporting tongue truck rotatably mounted on the bowed front end of said frame.

4. A harrow having, in combination, a U-shaped main frame member, a forecarriage connected with the head of said frame member, a transversely arranged frame member having opposite ends thereof secured to the rear end of the side members of said main frame member, turnable tooth carrying bars carried by said main frame member, bracket members secured to the side frame members and provided with laterally extending sleeve portions, stub axles having the body portions thereof received by said sleeves and the inner ends thereof turned inward and upward and secured to the said transversely arranged frame member, and carrying wheels journaled upon the opposite ends of said axles.

CHARLES S. SHARP.

Witnesses:
K. T. ELLIOTT,
HUGH S. WYLLIE.

Copies of this patent may be obtained for five cents each, by addressing the "Commissioner of Patents, Washington, D. C."